3/11/86 XR 4,574,454

United States Patent [19]
Dyson

[11] Patent Number: 4,574,454
[45] Date of Patent: Mar. 11, 1986

[54] METHOD OF CONSTRUCTING FIRE RESISTANT ENCLOSURES

[75] Inventor: George W. Dyson, Albrighton, England

[73] Assignee: Chubb & Son's Lock and Safe Company Limited, Feltham, England

[21] Appl. No.: 691,021

[22] Filed: Jan. 14, 1985

[30] Foreign Application Priority Data

Jan. 14, 1984 [GB] United Kingdom ................. 8400990

[51] Int. Cl.[4] ........................... B23P 3/00; E05G 1/00; B29C 5/00; B28B 1/50

[52] U.S. Cl. ........................................ 29/434; 29/458; 29/460; 109/65; 109/84; 220/444; 220/468; 52/265; 52/232; 52/809; 312/214; 264/34; 264/46.4; 264/259; 264/256; 264/261

[58] Field of Search ................ 264/34, 46.4, 250, 255, 264/256, 259, 261, 262; 249/142, 144, 145, 160, 163, 83; 29/434, 458, 460; 312/214; 109/65, 82, 84; 52/204, 232, 265, 809, 309.4

[56] References Cited

U.S. PATENT DOCUMENTS

| | | | |
|---|---|---|---|
| 1,507,032 | 9/1924 | Schmitz | 249/160 X |
| 2,492,422 | 12/1949 | Govan | 109/84 |
| 2,613,623 | 10/1952 | Behrens | 109/65 X |
| 2,622,547 | 12/1952 | Fecgelstad | 109/65 |
| 2,684,646 | 7/1954 | Henkel | 109/65 |
| 3,391,823 | 7/1968 | Tijms | 264/255 X |
| 3,559,594 | 2/1971 | Miller | 109/84 |
| 3,702,592 | 11/1972 | Gamble | 109/84 X |
| 3,745,738 | 7/1973 | Singer | 264/34 X |
| 3,802,975 | 4/1974 | Saidla | 264/261 X |
| 3,845,183 | 10/1974 | Harrison | 264/250 X |
| 3,894,823 | 7/1975 | Hanning | 264/250 X |
| 4,032,608 | 6/1977 | Zinniger et al. | 264/255 X |
| 4,040,166 | 8/1977 | Morphy | 264/261 X |
| 4,048,926 | 9/1977 | Brush et al. | 109/65 |
| 4,060,581 | 11/1977 | Darby et al. | 264/256 X |
| 4,155,972 | 5/1979 | Hauser et al. | 264/250 |
| 4,158,082 | 6/1979 | Belousofsky | 264/256 X |
| 4,172,316 | 10/1979 | Rock et al. | 29/434 X |
| 4,185,437 | 1/1980 | Robinson | 264/256 X |
| 4,261,083 | 4/1981 | Darby et al. | 264/256 X |
| 4,289,717 | 9/1981 | Bartz | 264/261 X |
| 4,307,543 | 12/1981 | Schulthess | 52/232 X |
| 4,364,987 | 12/1982 | Goodwin | 264/256 X |
| 4,422,386 | 12/1983 | Carpenter | 109/84 X |
| 4,422,997 | 12/1983 | Machnik | 264/261 |

*Primary Examiner*—J. Howard Flint, Jr.
*Attorney, Agent, or Firm*—Pollock, Vande Sande & Priddy

[57] ABSTRACT

The body of a cabinet for storing temperature-sensitive articles such as magnetic discs and tapes is built by a process which involves the successive steps of (i) fabricating an internal skin; (ii) attaching so-called "phase-change" material to the skin; (iii) applying insulative polyurethane foam in-situ to the structure of step (ii); (iv) casting concrete or the like water-bearing material around the structure of step (iii); and (v) completing the outer finishing skin. Thus the conventional "double-box" structure is avoided. The door for the cabinet can be built by a similar sequence in which "phase-change" material, insulative form and water-bearing layers are applied successively to a pan forming the internal face of the door.

11 Claims, 9 Drawing Figures

METHOD OF CONSTRUCTING FIRE RESISTANT ENCLOSURES

The present invention relates to fire-resistant enclosures for the protection of temperature-sensitive articles and is concerned especially with the construction of fire-resistant cabinets and files intended for the storage of electronic data-processing media such as magnetic discs and tapes. Information stored on magnetic media rapidly degrades if the record carrier is heated to a temperature above about 60°C. (or about 50°C. in the case of so-called diskettes or floppy discs) and fire-resistant equipment for storing these kinds of material (for convenience termed herein "data cabinets") must therefore be capable of maintaining an internal temperature below the appropriate level when exposed to fire conditions over a specified period.

To achieve the required protective performance data cabinets are generally equipped with a combination of different heat-insulative or heat-absorbing layers. Typically there is an outer layer of water-bearing material such as a cement-based material, gypsum or plaster which acts to delay heat penetration to the interior of the cabinet as the moisture within the material absorbs its latent heat in turning to steam. Inside this layer is a layer of high-grade insulation for which various materials may be employed, including glass or other mineral fibres, or urethane foam. A more recent innovation is a final layer, closest to the interior of the cabinet, of a material having a high latent heat of fusion and a melting point just below the specified acceptable internal cabinet temperature, which is capable of absorbing any heat which penetrates through the outer layers over a significant period of time, in melting from the solid to the liquid state. This third kind of material (for convenience termed herein "phase-change material") can thus act to hold the internal temperature of the cabinet below the critical level throughout the period during which it is undergoing its change of phase. Known materials for this purpose include paraffin wax and hydrated forms of sodium acetate, meta silicate and thiosulphate.

Conventionally, the bodies of data cabinets as described above are constructed in two separate sub-assemblies. The first sub-assembly is an open box-like structure comprising the above-mentioned water-bearing material encased between steel skins. The second sub-assembly is a similar but smaller box-like structure encasing the above-mentioned insulative and phase-change materials, which is then fitted into the larger box. This practice of preparing and assembling together two distinct structures is both time consuming and wasteful of material in the provision of separate casings for the two sub-assemblies. The presence of a steel casing layer intermediate the inner and outer skins of the body can also aggravate the problem of heat in-leak from the exterior of the cabinet. It is therefore an aim of the present invention to provide a lower-cost production method for data cabinets by eliminating the double-assembly procedure described above.

Accordingly, the invention proposes a method of constructing the body of a fire-resistant enclosure for the protection of temperature-sensitive articles, which comprises the successive steps of:

(i) providing an open box-like structure to constitute an internal skin of the body;

(ii) applying to at least some of the external surface of said structure a layer of phase-change material (as before defined);

(iii) applying to the external surface of the assembly of said structure and phase-change material a layer of thermally-insulative material; and (iv) applying to the external surface of the assembly of said structure, phase-change material and thermally-insulative material a layer of water-bearing material;

whereby the finished body comprises successive layers of said phase-change, thermally-insulative and water-bearing materials built upon said structure.

The invention also resides in a fire-resistant enclosure for the protection of temperature-sensitive articles, of which the body is constructed by the above-defined method, per se.

Preferably, the thermally-insulative material is polyurethane or the like foam, which is foamed in-situ as will be described hereinafter, the water-bearing layer also being cast in-situ. It is also possible for the phase-change layer to be cast in-situ.

The door for the enclosure can also be constructed by a similar method in which successive layers of phase-change, thermally-insulative and water-bearing materials are built upon a generally planar or dish-like structure which constitutes the internal face of the door.

These and other aspects of the invention will become apparent from the following description fo a particular example thereof, taken in conjunction with the accompanying drawings, in which.

Figure 1:
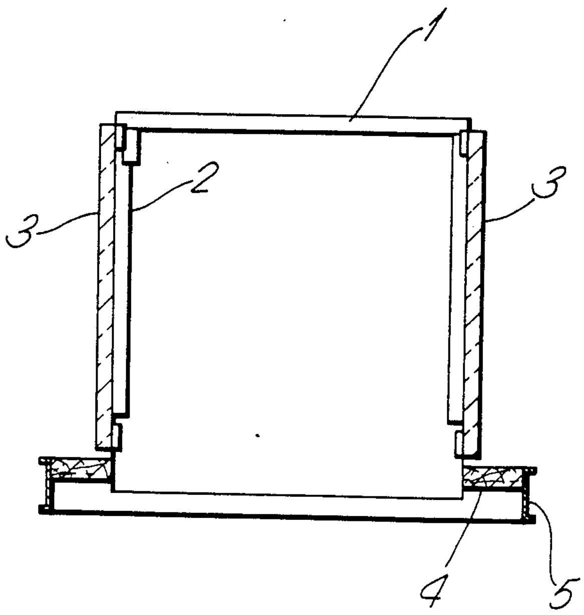
FIGS. 1–4 are schematic sectional views taken through the body of a data cabinet during successive stages in the construction thereof.

Referring to FIG. 1, the first stage in the construction of the cabinet body is to prepare a five-sided box 1 of sheet steel which is to constitute the interior finishing skin of the cabinet, together with its shelf supports 2 or other fixtures appropriate to the storage of the articles destined to be protected by the cabinet. To the external faces of this box slabs of a hydrated phase-change material 3 are then applied. The slabs 3 may be prepared by casting the phase-change material into flat capsules of polythene or other impermeable membrane material, which are then stuck onto the box 1 by any simple means, such as with double sided adhesive tape. Alternatively, with the use of suitable shuttering to define the required slab shape, the phase-change material 3 could be cast directly onto the steel skin, having first sealed any joints in the steel, and, when set, sprayed with polyurethane to form an impermeable film around the slabs. These phase-change slabs may be applied to all five faces of the box 1 or (as illustrated), to only part of the box surface, as in use the steel skin will act to conduct any heat which reaches any part of it to those faces which are being cooled by the phase transformation of adjacent slabs 3. At this stage of construction, the box 1 is also assembled with a wooden frame 4 around its open end—which in the completed cabinet acts as a heat break between the outer and inner finishing skins—and an outer steel apron 5.

Figure 2:
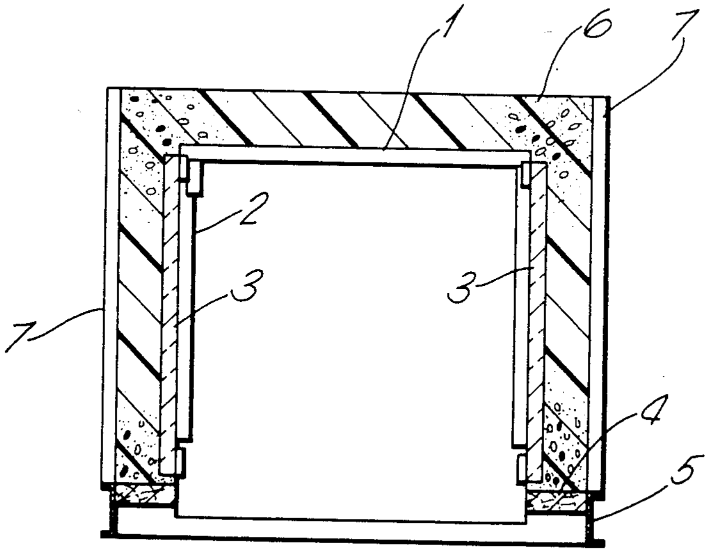

Next, and as shown in FIG. 2, a layer of polyurethane foam insulation 6 is applied to the external surfaces of the assembly of box 1 and slabs 3. This insulation may be in the form of pre-cut blocks which are taped or otherwise fixed in place upon the existing assembly, but preferably it is a monolithic layer formed and foamed in-situ. To this end, shuttering 7 is erected around the assembly and the foaming resin is sprayed into the mould cavity thus formed. This in-situ foaming technique involves the use of a mixing nozzle to which the polyol and isocyanate components which go to make up the polyurethane resin are fed together with a low boiling point foaming agent such as FREON (registered trade mark). The use of in-situ foaming is of particular advantage in ensuring that no void spaces are left in the insulation layer, and as the resin flows intimately around the slabs 3 and through any gaps between adjacent slabs into contact with the steel skin 1 it provides excellent support and location for the phase slabs when set. Having settled and set, the shuttering 7 is removed from the insulation layer 6 which is then covered with a moisture-proof membrane, such as polythene sheet or a sprayed-on polyurethane film, to keep out steam from the outer water-bearing layer under fire conditions.

Figure 3:
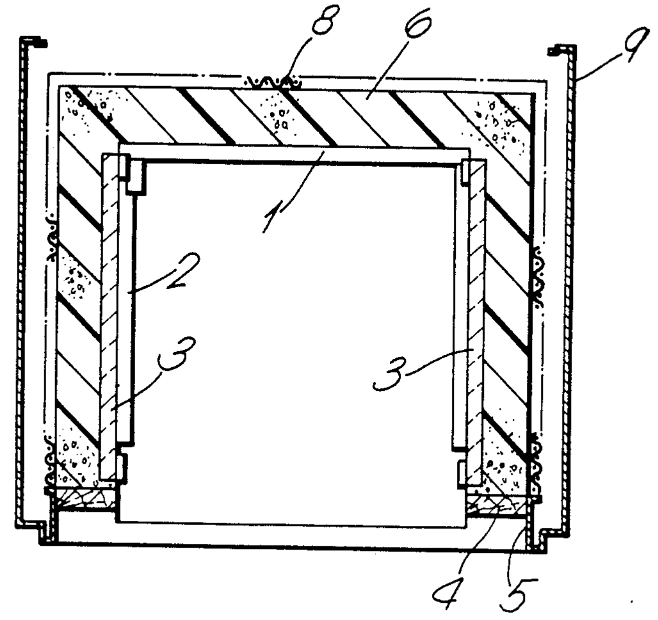
Figure 4:
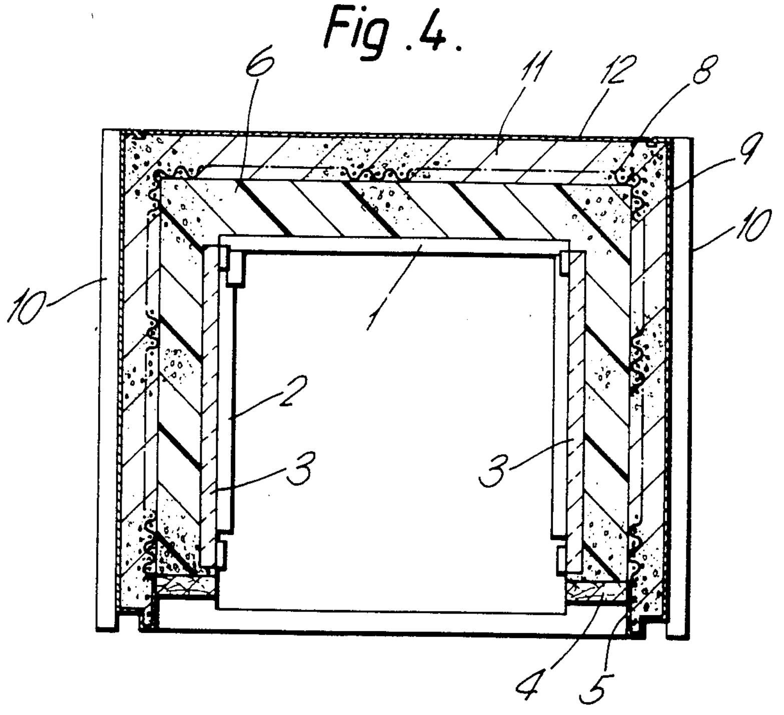
Figure 5:
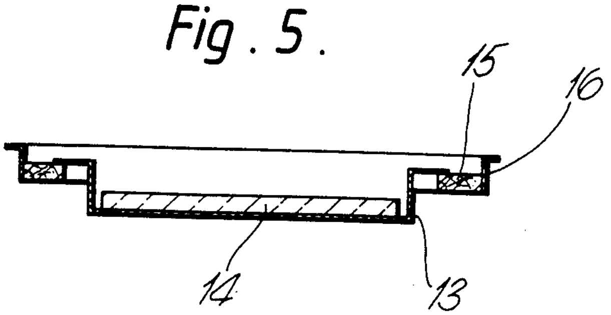
FIGS. 5–8 are similar views taken through the door for the data cabinet during successive stages in its construction.
Figure 6:
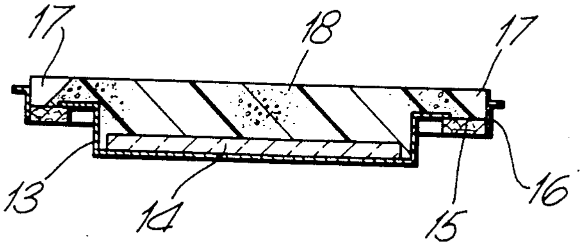
Figure 7:
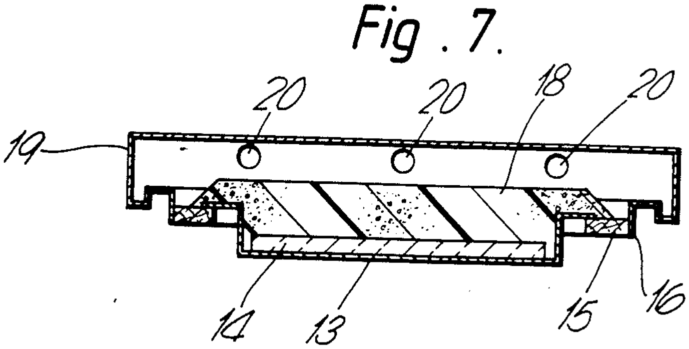
Figure 8:
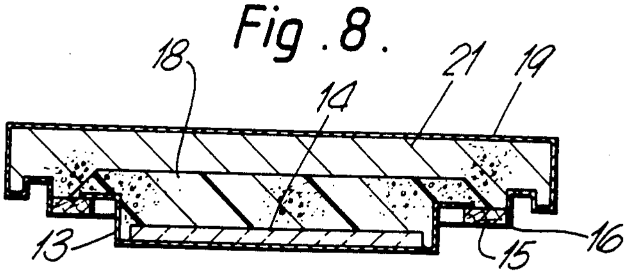

With reference to FIG. 3, the next step is to fit an expanded metal mesh 8 around the body, being fixed to the apron 5, to anchor and reinforce the subsequent water-bearing material. The two sides, top and bottom of the cabinet's outer steel finishing skin 9 are then attached to the apron 5, leaving the back open. The assembly is then supported in a jig 10 (FIG. 4) and the water-bearing material 11 is cast through the open back into the space between the insulation layer 6 and outer skin 9; the preferred material for this purpose is a mixture of portland cement and diatomaceous earth. When this final layer has set, the rear steel panel 12 of the cabinet is welded on and the body is removed from the jig 10 ready to be painted and united with its door.

The various steps in constructing the door of this cabinet follow a similar sequence and will now be described with reference to FIGS. 5-8. A steel pan 13 is first prepared (FIG. 5), which will constitute the inner door panel in the finished cabinet. A slab of phase-change material 14 is located in this pan, and the pan is also assembled with a wooden heat-break frame 15 and an outer steel apron 16. Next, shuttering 17 is fitted (FIG. 6) and a layer of in-situ foamed polyurethane insulation 18 is applied. The shuttering 17 is removed and the outer steel door panel 19 (FIG. 7) is fixed to the apron 16. The panel 19 has holes 20 in one edge (the lower edge in the finished door) through which the portland cement/diatomaceous earth paste is then poured in to fill the remaining cavity within the door, as shown at 21 in FIG. 8, after which the holes 20 are plugged.

Figure 9:
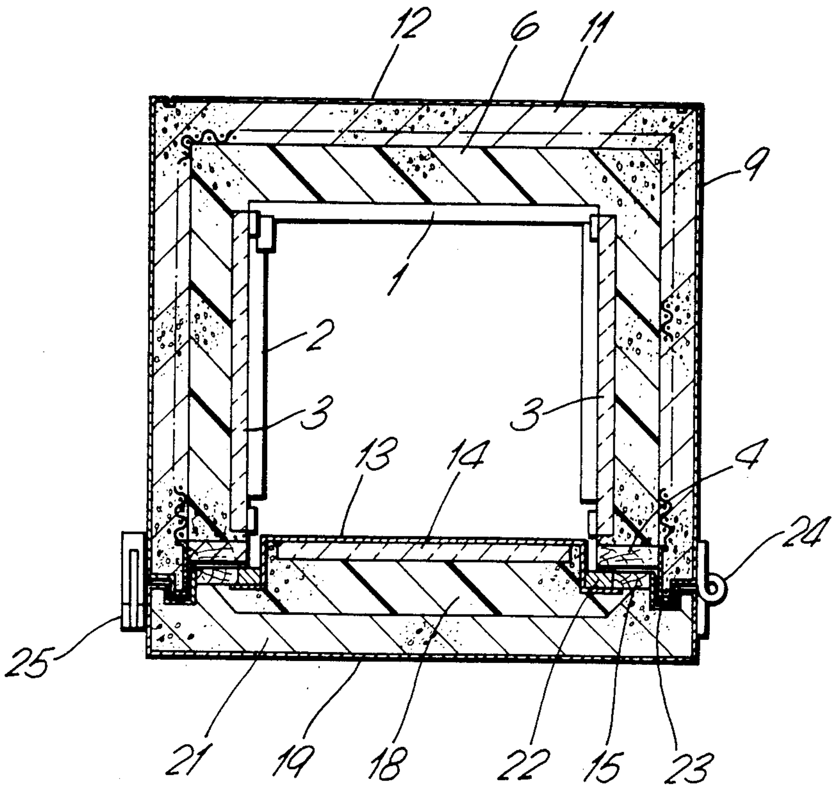
FIG. 9 is a similar view taken through the completed cabinet.

The door and body are finally assembled together as indicated in FIG. 9, together with seals 22,23 hinge means 24 and a latching and clenching mechanism 25.

Although described above in terms of its application to the construction of a cabinet closed by a hinged door, a construction method according to the invention involving the building up of successive layers of phase-change, thermally-insulative and water-bearing materials upon an internal skin can equally be utilised in the manufacture of the body of a fire-resistant file which is closed by appropriately constructed drawers.

I claim:

1. A method of constructing the body of a fire-resistant enclosure for the protection of temperature-sensitive articles, which comprises the successive steps of:

(i) providing an open box-like structure to constitute an internal skin of the body;

(ii) applying to at least some of the external surface of said structure a layer of phase-change material (as herein defined);

(iii) applying to the external surface of the assembly of said structure and phase-change material a layer of thermally-insulative material; and (iv) applying to the external surface of the assembly of said structure, phase-change material and thermally-insulative material a layer of water-bearing material;

whereby the finished body comprises successive layers of said phase-change, thermally-insulative and water-bearing materials built upon said structure.

2. A method according to claim 1 wherein shuttering is placed in spaced relation to said structure, and said layer of phase-change material is formed in-situ by casting that material in fluid form into the space defined between the external surface of said structure and said shuttering.

3. A method according to claim 1 wherein shuttering is placed in spaced relation to said structure, and said thermally-insulative material is a foamed polymer and said layer thereof is formed in-situ by casting the fluid foam into the space defined between the external surface of the assembly of said structure and phase-change material, and said shuttering.

4. A method according to claim 1 wherein an external skin of the body is placed in spaced relation to said structure, and said layer of water-bearing material is formed in-situ by casting that material in fluid form into the space defined between the external surface of the assembly of said structure, phase-change material and thermally-insulative material, and at least part of said external skin of the body.

5. A method according to claim 4 wherein a wooden frame which is adapted to form a heat break between said internal and said external skin of the completed body, is attached around the oppening of said structure prior to said application of the layer of thermally-insulative material.

6. A method of constructing the door of a fire-resistant enclosure for the protection of temperature-sensitive articles, which comprises the successive steps of:

(i) providing a structure to constitute an internal face of the door;

(ii) applying to at least part of the external surface of said face structure a layer of phase-change material;

(iii) applying to the external surface of the assembly of said face structure and phase-change material a layer of thermally-insulative material; and (iv) applying to the external surface of the assembly of said face structure, phase-change material and thermally-insulative material a layer of water-bearing material;

whereby the finished door comprises successive layers of said phase-change, thermally-insulative and water-bearing materials built upon said face structure.

7. A method according to claim 6 wherein said layer of phase-change material in said door is formed in-situ by casting that material in fluid form onto said face structure.

8. A method according to claim 6 wherein said thermally-insulative material in said door is a foamed polymer and said layer thereof is formed in-situ by casting the fluid foam onto the assembly of said face structure and phase-change material.

9. A method according to claim 6 wherein an external face structure is placed in spaced relation to said internal face structure, and said layer of water bearing material in said door is formed in-situ by casting that material in fluid form into the space defined between the external surface of the assembly of said internal face structure, phase-change material and thermally-insulative material, and at least part of said external face structure.

10. A method according to claim 9 wherein a wooden frame which is adapted to form a heat break between said internal and external face structures of the completed door, is attached around the edge of said internal face structure prior to said application of the layer of thermally-insulative material of the door.

11. A method of constructing a fire-resistant enclosure for the protection of temperature-sensitive articles, which comprises constructing the body of said fire-resistant enclosure by the successive steps of providing an open box-like structure to constitute an internal skin of the body, applying to at least some of the external surface of said structure a layer of phase-change material, applying to the external surface of the assembly of said structure and phase-change material a layer of thermally-insulative material, and applying to the external surface of the assembly of said structure, phase-change material and thermally-insulative material a layer of water-bearing material, whereby the finished body comprises successive layers of said phase-change, thermally-insulative and water-bearing materials built upon said structure; constructing a door for said fire-resistant enclosure by the successive steps of providing a face structure to constitute an internal face of the door, applying to at least part of the external surface of said face structure a layer of phase-change material, applying to the external surface of the assembly of said face structure and phase-change material layer of thermally-insulative material, and applying to the external surface of the assembly of said face structure, phase-change material and thermally-insulative material a layer of water-bearing material, whereby the finished door comprises successive layers of said phase-change, thermally-insulative and water-bearing materials built upon said face structure; and uniting said body and door.

* * * * *